United States Patent
Baque et al.

(10) Patent No.: US 12,476,456 B2
(45) Date of Patent: Nov. 18, 2025

(54) DC ELECTRICAL POWER DISTRIBUTION DEVICE, AND ASSOCIATED PROPULSION SYSTEM AND AIRCRAFT

(71) Applicant: SAFRAN ELECTRICAL & POWER, Blagnac (FR)

(72) Inventors: Franck Baque, Moissy-Cramayel (FR); Quentin Cornu, Moissy-Cramayel (FR); Fabrice Guerin, Moissy-Cramayel (FR); Guillaume Percheron, Moissy-Cramayel (FR); Alexis Renotte, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/838,163

(22) PCT Filed: Feb. 6, 2023

(86) PCT No.: PCT/FR2023/050155
§ 371 (c)(1),
(2) Date: Aug. 13, 2024

(87) PCT Pub. No.: WO2023/152439
PCT Pub. Date: Aug. 17, 2023

(65) Prior Publication Data
US 2025/0149884 A1    May 8, 2025

(30) Foreign Application Priority Data

Feb. 14, 2022   (FR) ........................... 2201288

(51) Int. Cl.
*H02J 1/08*        (2006.01)
*B64D 47/00*       (2006.01)

(52) U.S. Cl.
CPC .............. *H02J 1/084* (2020.01); *B64D 47/00* (2013.01); *B64D 2221/00* (2013.01)

(58) Field of Classification Search
CPC .... H02J 1/084; H02J 1/086; H02J 1/08; H02J 2310/44; B64D 47/00; B64D 2221/00
See application file for complete search history.

(56) References Cited

U.S. PATENT DOCUMENTS 8,344,544 B2 *  1/2013  Rozman .................... H02J 1/10
                                                 307/29
2011/0260538 A1 * 10/2011 Huang ..................... H02J 9/062
                                                 307/64

(Continued)

FOREIGN PATENT DOCUMENTS

EP     2980946 B1    2/2016
EP     3703220 A1    3/2019

(Continued)

OTHER PUBLICATIONS

International Search Report mailed Mar. 27, 2023, issued in corresponding International Application No. PCT/FR2023/050155, filed Feb. 6, 2023, 6 pages.

(Continued)

*Primary Examiner* — Lincoln D Donovan
*Assistant Examiner* — Alex W Lam
(74) *Attorney, Agent, or Firm* — Christensen O'Connor Johnson Kindness PLLC

(57) ABSTRACT

A DC electrical power distribution device for an aircraft propulsion duct having a main power supply line configured to supply at least one propulsion assembly of the propulsion duct with power from a high-voltage DC electrical power supply source and including main switching means and fast switching means for connecting the source to the propulsion assembly. The device can include a secondary power supply line configured to be connected to another distribution device and configured to supply the propulsion assembly with power from the other device when the main switching means are open.

3 Claims, 5 Drawing Sheets

(56) References Cited

U.S. PATENT DOCUMENTS

2012/0123625 A1\* 5/2012 Ueo .................. B60L 50/16
                                                  701/22
2015/0097422 A1\* 4/2015 Toothman ............ H02J 1/12
                                                   307/9.1

FOREIGN PATENT DOCUMENTS

| EP | 3588729 B1 | 1/2020 |
| EP | 3683911 A1 | 7/2020 |
| FR | 3050882 A1 | 11/2017 |
| FR | 3065840 A1 | 11/2018 |
| FR | 3098663 A1 | 1/2021 |
| WO | 2015145076 A1 | 10/2015 |
| WO | 2019145777 A1 | 8/2019 |
| WO | 2020174165 A1 | 3/2020 |

OTHER PUBLICATIONS

Written Opinion mailed Mar. 27, 2023, issued in corresponding International Application No. PCT/FR2023/050155, filed Feb. 6, 2023, 7 pages.
Park, Jae Do et al.; DC Ring-Bus Microgrid Fault Protection and Identification of Fault Location; IEEE Transactions on Power Delivery; Oct. 2013; pp. 2574-2584; vol. 28; No. 4; IEEE.

\* cited by examiner

DC ELECTRICAL POWER DISTRIBUTION DEVICE, AND ASSOCIATED PROPULSION SYSTEM AND AIRCRAFT

CROSS-REFERENCE TO RELATED APPLICATIONS

This application is a National Stage of International Application No. PCT/FR2023/050155, filed Feb. 6, 2023, which claims priority to French Patent Application No. 2201288, filed Feb. 14, 2022, the entire disclosures of which are hereby incorporated by reference in their entirety for all purposes.

TECHNICAL FIELD OF THE INVENTION

The invention relates to aircraft electrical power propulsion systems, and more particularly DC electrical power distribution devices.

The invention further relates to an electric propulsion system including such devices and an aircraft including such a system.

PRIOR ART

Generally, aircraft are propelled by turbine engines of the turboprop, turbofan or turbine type.

However, the use of turbine engines is associated with significant noise emissions and high fossil fuel consumption, particularly of kerosene, also generating significant pollutant emissions.

In order to reduce the noise and pollutant emissions, aircraft propulsion may be electric, by replacing the turbine engines intended to produce the thrust of the aircraft with electric motors.

The electrical networks on board aircraft generally comprise a combination of an AC network, for example of 115 Volts AC or 230 Volts AC and a low-voltage DC network, for example of 28 Volts DC, or a single DC network, for example of 28 Volts DC.

An onboard AC network in an aircraft provides a total onboard electrical power between 50 to 500 kW, and up to 1 MW.

An onboard DC network in an aircraft provides an electrical power lower than 100 kW.

Furthermore, the electrical architecture of such a network is usually developed for a given application and for a given type of aircraft preventing the network from being reused with another type of aircraft.

In addition, the electric propulsion system is an aircraft critical system that must meet stringent operational safety requirements in order to be certified.

A redundancy of critical elements of the propulsion system is required increasing the mass of the aircraft.

Documents WO 2020/174165 and FR 3 098 663 disclose electric propulsion system architectures.

Documents EP 3588729, EP 2980946 and FR 3050882 disclose electrical power supply networks for aircraft.

Document EP 3703220 discloses a method for controlling a voltage delivered by an active rectifier unit connected to a battery.

Document EP3683911 discloses interconnected high-voltage DC electrical networks.

There is a demand for components making it possible to operate at a voltage of 800 VDC, and at powers in the order of 100 to 250 KW making it possible to implement a high-voltage DC network Such components would be particularly advantageous for electric propulsion aircraft including rotating electric machines driving thrust propellers.

DESCRIPTION OF THE INVENTION

The invention aims to overcome all or part of these drawbacks.

The object of the invention is a DC electrical power distribution device for an aircraft propulsion duct, comprising a main power supply line intended to supply at least one propulsion assembly of the propulsion duct with power from a high-voltage DC electrical power supply source and including main switching means for connecting said source to said propulsion assembly.

The device further comprises a secondary power supply line intended to be connected to another distribution device and configured to supply said propulsion assembly with power from another device when the main switching means are open.

During the detection of a failure of the power supply source, of the propulsion assembly or of the main power supply line of the device, said device is reconfigured to supply the propulsion assembly with power from another device.

The architecture of the devices makes it possible to ensure a power supply redundancy of the propulsion assembly connected to the device.

A high-voltage direct current is defined as being a direct current greater than 270 volts.

Preferably, the main power supply line extends between input terminals intended to be connected to the source and output terminals intended to be connected to the propulsion assembly, the main power supply line comprising a power bus connected to the output terminals and connected to the input terminals by means of main switching means and fast switching means, and the secondary power supply line is connected to the bus by means of secondary switching means and including input terminals intended to be connected to input terminals of the secondary power supply line of the other device, the device further including control means configured to open the main switching means and the fast switching means, and second control means configured to close the secondary switching means during the detection of a failure of the propulsion assembly, of the main power supply line or of the source.

Advantageously, the main power supply line extends between input terminals intended to be connected to the source and output terminals intended to be connected to the propulsion assembly, the main power supply line comprising a power bus and a power line, the bus being connected to the output terminals and connected to the input terminals by means of main switching means and fast switching means, the power line being connected between the input terminals and the main switching means and being intended to be connected to the secondary power supply line of the other device, and the secondary power supply line is connected to the bus by means of secondary switching means and including input terminals intended to be connected to input terminals of the power line of the other device, the device further including control means configured to open the main switching means and the fast switching means, and second control means to close the secondary switching means during the detection of a failure of the propulsion assembly, of the main power supply line or of the source.

Preferably, the device further comprises charging terminals connected between the input terminals and the main switching means or between the main switching means and the fast switching means by means of charge switching means and intended to charge the reversible power supply source from a charger, the control means being further configured to close the charge switching means in order to charge the reversible source.

Advantageously, the main power supply line extends between input terminals intended to be connected to the source and output terminals intended to be connected to the propulsion assembly, the main power supply line comprising a power bus connected to the output terminals by means of fast switching means and connected to the input terminals by means of main switching means and comprising charging terminals connected by means of charge switching means between the input terminals and the main switching means and intended to be connected to a charger and to the charging terminals of the other device, and the secondary power supply line comprises second output terminals connected to the bus by means of secondary switching means and intended to be connected to the output terminals of the other device, the device further comprising control means configured to open the main switching means, the fast switching means, and the secondary switching means during the detection of a failure of the propulsion assembly, of the main power supply line or of the source.

A propulsion system is also proposed comprising at least two identical devices as defined previously, wherein the input terminals of the secondary power supply line of a first device are connected to the input terminals of the secondary power supply line of the second device.

Preferably, the propulsion system comprises at least two identical devices as defined previously, wherein the input terminals of the power line of a first device are connected to the input terminals of the secondary power supply line of the second device.

Advantageously, the propulsion system comprises at least four identical devices as defined previously, wherein the input terminals of the power line of a first device are connected to the input terminals of the secondary power supply line of a second device, the input terminals of the secondary power supply line of the first device are connected to the input terminals of the power line of a third device, the input terminals of the power line of the second device are connected to the input terminals of the secondary power supply line of the fourth device, and the input terminals of the power line of the fourth device are connected to the input terminals of the secondary power supply line of the third device.

Preferably, the propulsion system comprises at least two identical devices as defined previously, wherein the charging terminals of a first device are connected to the charging terminals of the second device, and wherein at least one pair of output terminals of the main power supply line of the first device is connected to a pair of input terminals of the secondary power supply line of the second device.

An aircraft comprising a propulsion system as defined previously is also proposed.

BRIEF DESCRIPTION OF THE DRAWINGS

Other aims, features and advantages of the invention will become apparent upon reading the following description, given solely by way of non-limiting example, and made with reference to the appended drawings wherein.

DETAILED DESCRIPTION OF AT LEAST ONE EMBODIMENT

Figure 1:
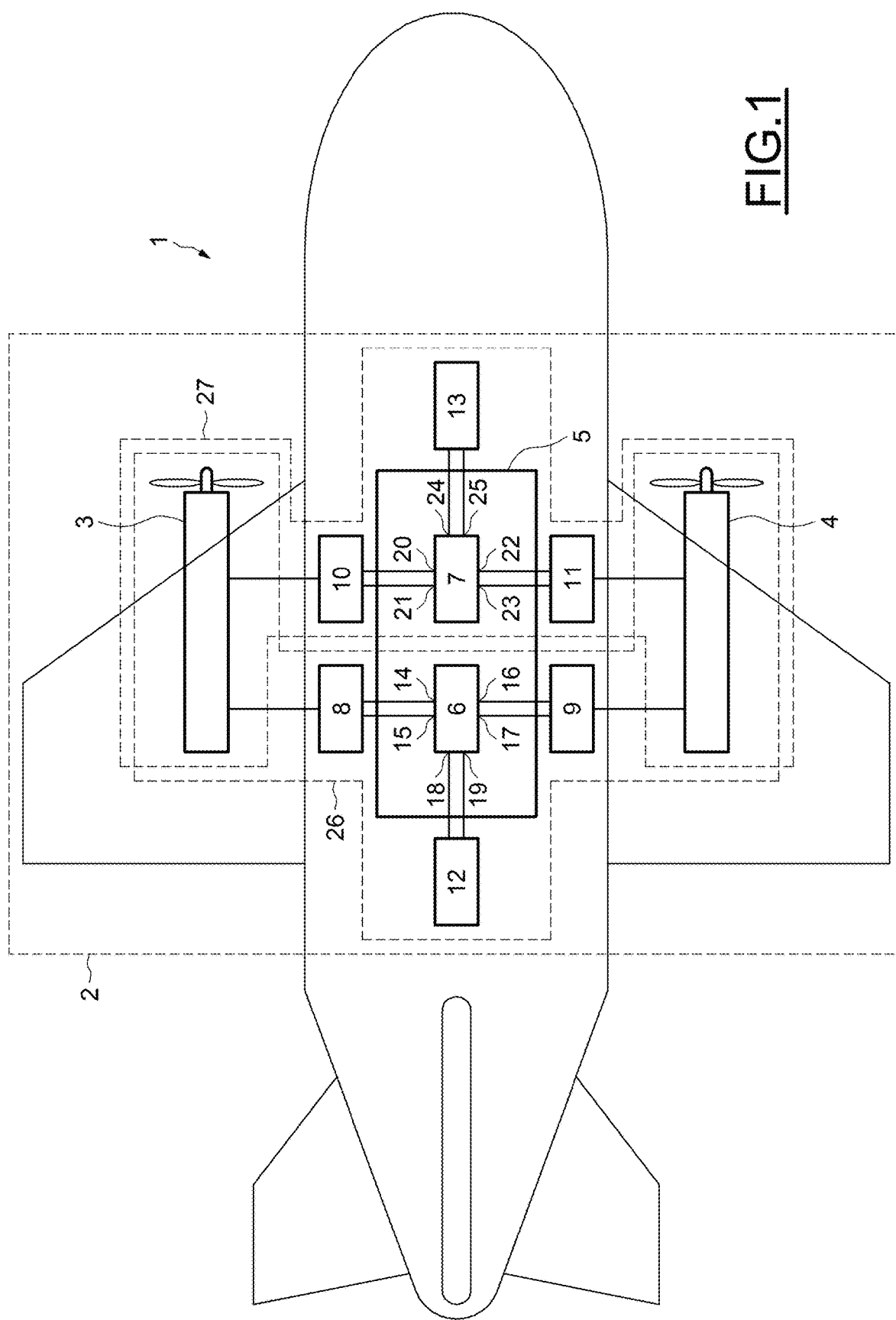
FIG. 1 schematically illustrates an aircraft according to the invention.

Reference is made to FIG. 1 which schematically illustrates an aircraft 1 comprising a propulsion system 2.

The propulsion system 2 comprises two rotating electric machines 3, 4 each disposed on either side of a longitudinal axis of the aircraft 1 and each provided with a propeller for propelling the aircraft 1.

Alternatively, the aircraft 1 may comprise more than two rotating electric machines 3, 4 disposed in equal number on either side of the longitudinal axis of the aircraft 1.

According to another alternative embodiment, the aircraft 1 may comprise only one rotating electric machine.

The propulsion system 2 further comprises an electrical distribution module including two identical electrical power distribution devices 6, 7, four power converters 8, 9, 10, 11 each supplying one of the rotating electric machines 3, 4, and two DC electrical voltage sources 12, 13 with power.

A first converter 8 is connected to a first and a second output terminal 14, 15 of a first electric power distribution device 6, and a second converter 9 is connected to a third and a fourth output terminal 16, 17 of the first electric power distribution device 6.

The first converter 8 supplies the first machine 3 with power and the second converter 9 supplies the second machine 4 with power.

A first source 12 is connected to input terminals 18, 19 of the first device 6.

A third converter 10 is connected to a first and a second output terminal 20, 21 of the second electric power distribution device 7, and the fourth converter 11 is connected to a third and a fourth output terminal 22, 23 of the second electric power distribution device 7.

The third converter 10 supplies the first machine 3 with power and the fourth converter 11 supplies the second machine 4 with power.

The second source 13 is connected to input terminals 24, 25 of the second device 7.

Alternatively, the first converter 8 and the third converter 10 may be integrated into the first rotating electric machine 3, and the second converter 9 and the fourth converter 11 may be integrated into the second rotating electric machine 4.

Each source 12, 13 comprises for example a fuel cell, a battery or a DC generator.

Each source 12, 13 may be reversible so that it may be charged from an electrical power supply network with the aircraft 1 or from the electrical energy produced by an electric generator disposed in the aircraft 1 or outside of the aircraft 1 and connected to the source 12, 13.

The first device 6 is supplied with power by the first source 12, and supplies the first and second converters 8, 9 with DC voltage.

The second device 7 is supplied with power by the second source 13, and supplies the third and fourth converters 10, 11 with DC voltage.

The first converter 8 supplies the first machine 3 with power and the second converter 9 supplies the second machine 4 with power.

The third converter 10 supplies the first machine 3 with power and the fourth converter 11 supplies the second machine 4 with power.

The first and second machines 3, 4 are each supplied with power independently by two converters 8, 10, 9, 11 so that if one of the two converters is faulty, said machine is supplied with power by the other converter.

Alternatively, each machine can be supplied with power by more than two independent power converters.

The converters 8 to 11 are of the inverter type and transform a DC voltage received from the first and second devices 6, 7 into a variable voltage in order to control the machines 3, 4.

The first and second machines 3, 4 supplied with power by the first and second converters 8, 9 form a first propulsion assembly.

The first device 6, the first source 12, and the first propulsion assembly form a first propulsion duct 26.

The first and second machines 3, 4 supplied with power by the first and second converters 10, 11 form a second propulsion assembly.

The second device 7, the second source 13, and the second propulsion assembly form a second propulsion duct 27.

Of course, the system 2 may comprise more than two propulsion ducts.

Each propulsion duct 26, 27 operates independently so that if one of the ducts 26, 27 is faulty, the other duct makes it possible to keep the aircraft 1 in flight.

Figure 2:
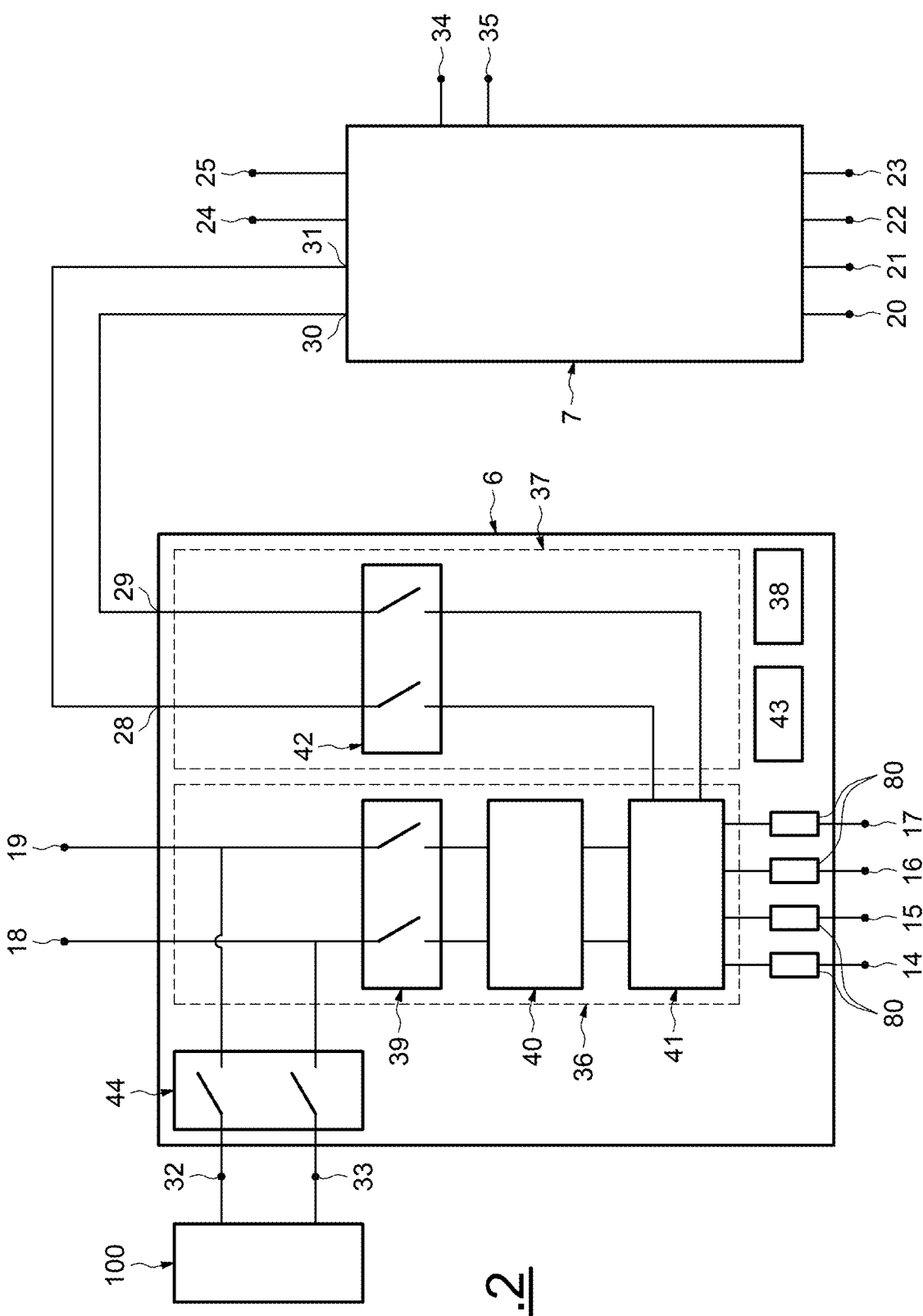
FIG. 2 schematically illustrates a first embodiment of an electrical distribution module according to the invention.

FIG. 2 schematically illustrates a first embodiment of an electrical distribution module 5.

The first and second devices 6, 7 further comprise second input terminals 28, 29, 30, 31.

The second input terminals 28, 29 of the first device 6 are connected to the second input terminals 30, 31 of the second device 7.

Each device 6, 7 may further comprise charging terminals 32, 33, 34, 35.

As the first and second devices 6, 7 are identical, only the first device 6 is detailed.

The first device 6 comprises a main power supply line 36, a secondary power supply line 37, and control means 38.

The control means 38 are performed for example from an aeronautical controller.

The main power supply line 36 includes main switching means 39 including for example a main switch, fast switching means 40 performed from semi-conductors, and a power bus 41 of the high-voltage DC type.

A DC high-voltage is defined as being a voltage greater than 270 volts.

The control means 38 are interfaced with the main switching means 39 and with the fast switching means 40.

The main switching means 39 are connected to the input terminals 18, 19 and to the input terminals of the fast switching means 40.

Output terminals of the fast switching means 40 are connected to the bus 41 supplying the output terminals 14 to 17 with power.

The output terminals 14 to 17 may each be connected to the bus 41 by means of protection means 80 including for example a pyroswitch or a switch.

The protection means 80 make it possible to electrically isolate one of the faulty converters 8, 9 by continuing to supply the other converter 9, 8 with power.

The fast switching means 40 known under the acronym "SSPC" (Solid state power controller) control and protect the electrical power supply of the output terminals 14 to 17 from the first source 12 connected to the input terminals 18, 19, and are connected to the control means 38.

The secondary power supply line 37 comprises secondary switching means 42 including for example a switch connected to the second input terminals 28, 29 and to the bus 41.

The fast switching means 40 comprise a device for pre-charging the capacitors connected to the bus 41. The pre-charging device is active upon closure of the fast switching means 40 in order to ensure a rise in voltage of the bus 41 that is slow enough to minimise the current draws of the source 12 connected to the input terminals 18, 19.

The secondary switching means 42 comprise a device for pre-charging the capacitors connected to the bus 41. The pre-charging device is active upon closure of the secondary switching means 40 in order to ensure a rise in voltage of the bus 41 that is slow enough to minimise the current draws of the source 12 connected to the second input terminals 28, 29.

The secondary switching means 42 are controlled by the control means 38.

Each terminal 14 to 19, 28, 29, 32 and 33 is equipped with a voltage sensor and a current sensor connected to the control means 38.

It is assumed that the main switching means 39 and the fast switching means 40 are closed so that the first source 12 supplies the output terminals 14 to 17 with power, and the secondary switching means 42 are open.

When the control means 38 detect a failure of the first propulsion assembly of the main power supply line 36 or of the first source 12, for example a short-circuit or an overload, from variables measured by the voltage sensors, the current sensors, and information transmitted by the fast switching means 39, the control means 38 control the main switching means 39 and the fast switching means 40 so that the main switching means 39 and the fast switching means 40 open.

The main switching means 39 and the fast switching means 40 make it possible to isolate the first propulsion assembly or the first source in order to prevent a propagation of the failure to other components of the aircraft 1.

The bus 41 is no longer supplied with direct current by the first source 12.

Each device 6, 7 further comprises second control means 43 performed for example from an aeronautical controller.

The second control means 43 of the first and second devices 6, 7 communicate with one another.

If the failure is located upstream of the main switching means 39, between the switching means 39 and the input terminals 18, 19, the control means 38 may control the secondary switching means 42 so that it is in closed position when the main switching means 39 are open, and communicate with the second control means 43 so that the control means of the second device 7 close the secondary switch of the second device 7.

Furthermore, the fault upstream of the main switching means 39 is isolated by the source 12 supplying the first device 6 with power so that the fault does not propagate into the propulsion duct.

The main switching means 39 and the secondary switching means 42 are not closed simultaneously so as to prevent placing the sources 12, 13 in parallel with the input terminals 18, 19 and with the second input terminals 28, 29.

The closure of the secondary switching means of the first and second devices 6, 7 makes it possible to supply the bus 41 of the first device 6 with power from the second source 13 so as to redundantly supply the first and second machines 3, 4 with power during the failure of the first source 12.

Of course, if the second source 13 is faulty, the devices 6, 7 are configured so that the first device 6 supplies the power bus of the second device 7 with power.

The reconfiguration of the first and second devices 6, 7 during the detection of a failure of one of the sources 12, 13 makes it possible to supply the propulsion assembly connected to the faulty source with power by the functional source.

The fast switching means 40 and the secondary main switching means 42 are of different technology so as to obtain an asymmetry of the switching components to improve the reliability of the devices 6, 7.

The main switching means 39 and secondary switching means 42 will be controlled independently to ensure a dissimilarity of the control of the device 6, 7. The main switching means 39 are controlled by the control means 38 whereas the secondary switching means 42 are controlled by the second control means 43.

The first device 6 further comprises charge switching means 44 ensuring the charge of the reversible source 12 controlled by the means 38 and connecting the charging terminals 32, 33 to the main power supply line 36 between the input terminals 18, 19 and the main switching means 39.

The charge switching means 44 include for example a switch.

When the charge switching means 44 are closed, the charging terminals 32, 33 recharge the first source 12 from a charger 100 connected to a terrestrial electrical power supply network when the aircraft 1 is on the ground, the first source 12 each comprising a reversible battery.

Alternatively, the charge switching means 44 are connected between the main switching means 39 and the fast switching means 40.

According to another alternative embodiment, the first device 6 does not comprise charging terminals 32, 33 and charging switches 44. The charging of the source 12 is then carried out through the secondary switching means 42.

Figure 3:
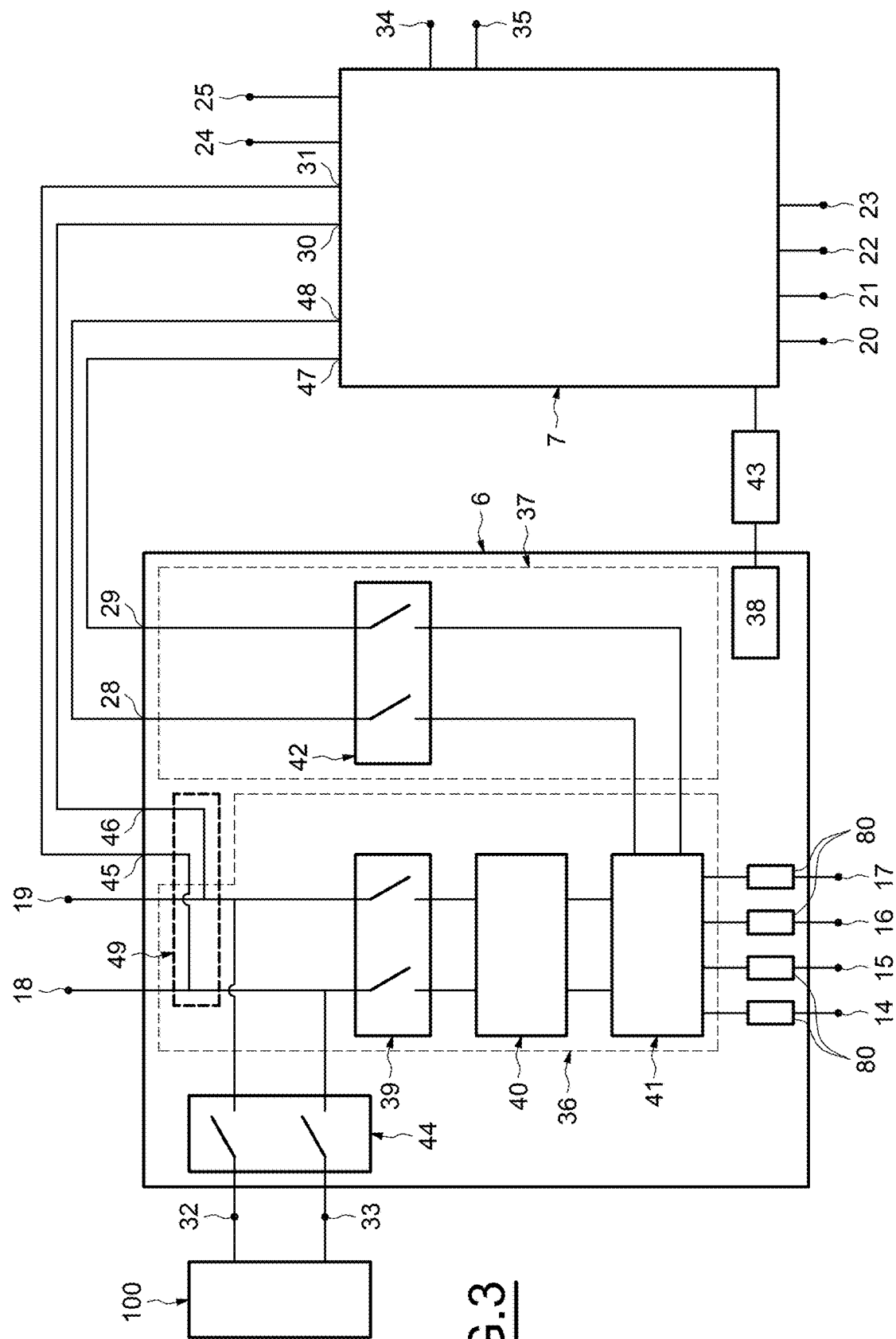
FIG. 3 schematically illustrates a second embodiment of the electrical distribution module according to the invention.

FIG. 3 schematically illustrates a second embodiment of an electrical distribution module 5.

It shows the first and second devices 6, 7 including the main power supply line 36, the secondary power supply line 37, the charging terminals 32, 33, 34, 35, and the protection means 80 as described previously.

The first and second devices 6, 7 further comprise power terminals 45, 46, 47, 48 connected to the input terminals 18, 19, 30, 31 by means of a power line 49.

The power terminals 45, 46 of the first device 6 are connected to the second input terminals 30, 31 of the second device 7, and the power terminals 47, 48 of the second device 7 are connected to the second input terminals 28, 29 of the first device 6.

In a similar way to the first embodiment illustrated in FIG. 2, when the control means 38 detect a failure of the first propulsion assembly or of the first source 12, the control means 38 control the main switching means 39 and the fast switching means 40 so that the main switching means 39 and the fast switching means 40 are open.

If the failure is located upstream of the bus 41, between the bus 41 and the input terminals 18, 19, the control means 38 control the secondary switching means 42 so that they are in closed position.

The closure of the secondary switching means 42 of the first device 6, makes it possible to supply the bus 41 of the first device 6 with power from the second source 13 so as to redundantly supply the first and second machines 3, 4 with power during the failure of the first source 12.

In this embodiment, the total electrical power exchanged between the two devices 6, 7 passes through the main power supply line 36 and the power line 49 making it possible to size the main switching means 39 and the fast switching means 40, and the bus 41 of the main power supply line 36, and furthermore the secondary switching means 42 according to the electrical powers delivered to the output terminals 14 to 17 and 20 to 23 of the two devices 6, 7 reducing the size and the weight of the switching means 39, 40, 42 and of the bus 41.

The mass and the volume of the two devices 6, 7 are reduced.

Figure 4:
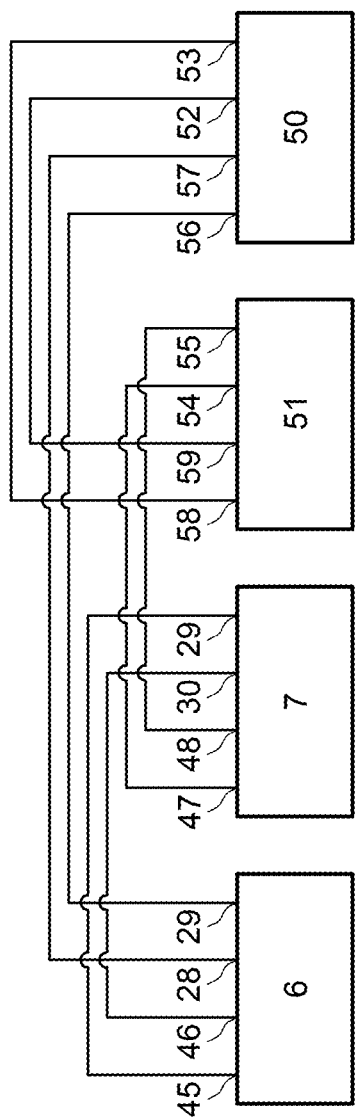
FIG. 4 schematically illustrates a third embodiment of the electrical distribution module according to the invention.

FIG. 4 schematically illustrates a third embodiment of an electrical distribution module 5.

The module 5 comprises four identical devices 6, 7, 50, 51 as defined in the second embodiment of the electrical distribution module 5 illustrated in FIG. 3.

In this embodiment, the four devices 6, 7, 50, 51 are connected to one another by circular switching.

Each device 6, 7, 50, 51 supplies a different propulsion assembly with power.

Each device 6, 7, 50, 51 and its associated propulsion assembly form a propulsion duct so that the four propulsion ducts supply for example four rotating electric machines with power.

Only the input terminals 28, 29, 30, 31, 52, 53, 54, 55 of the secondary power supply line of the devices 6, 7, 50, 51 and the input terminals 45, 46, 47, 48, 56, 57, 58, 59 of the power line of the devices 6, 7, 50, 51 are illustrated.

The input terminals 45, 46 of the power line of the first device 6 are connected to the input terminals 30, 31 of the secondary power supply line of the second device 7.

The input terminals 28, 29 of the secondary power supply line of the first device 6 are connected to the input terminals 56, 57 of the power line of a third device 50.

The input terminals 47, 48 of the power line of the second device 7 are connected to the input terminals 54, 55 of the secondary power supply line of the fourth device 51.

The input terminals of the power line 58, 59 of the fourth device 51 are connected to the input terminals 52, 53 of the secondary power supply line of the third device 50.

Figure 5:
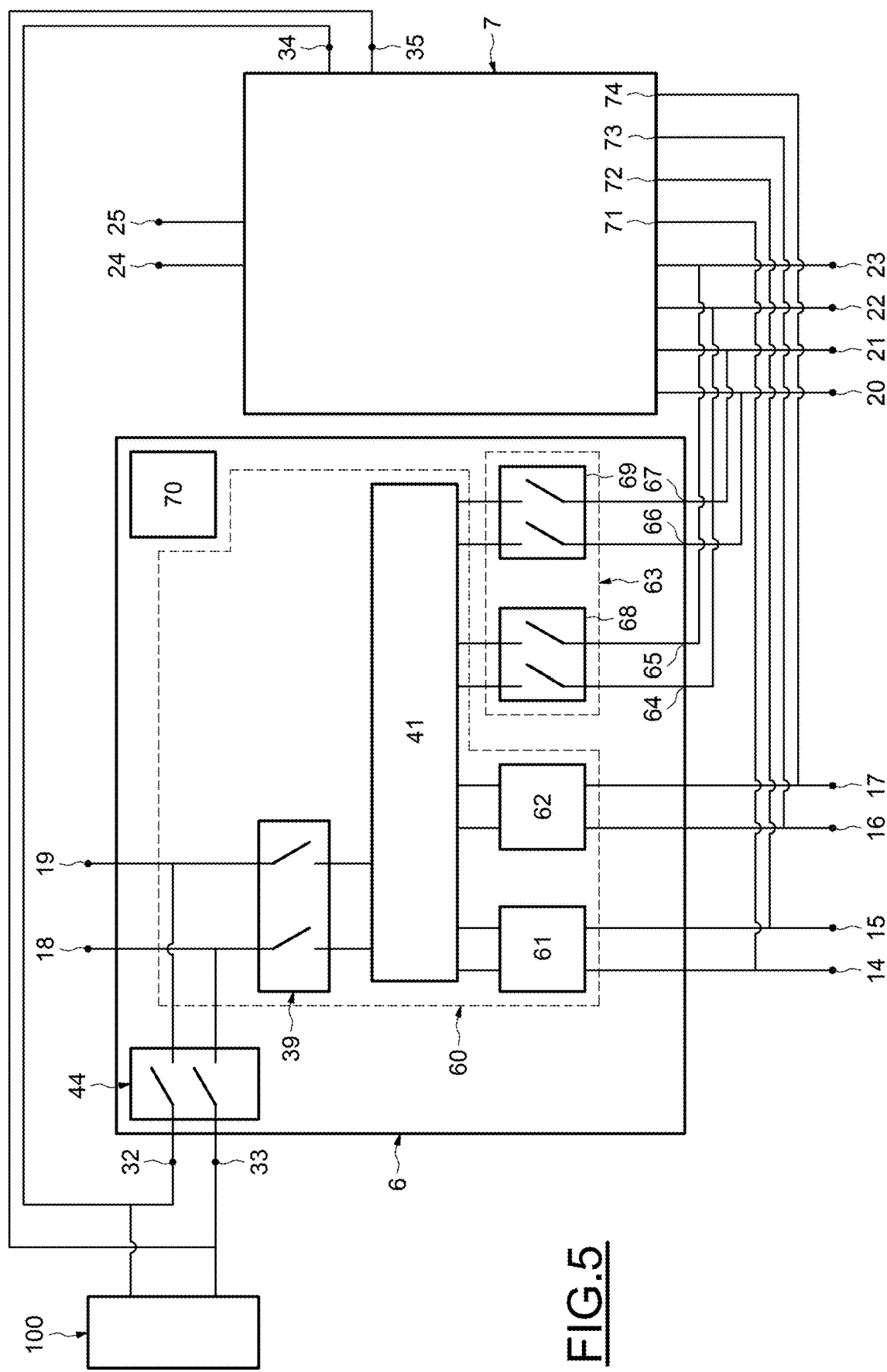
FIG. 5 schematically illustrates a fourth embodiment of the electrical distribution module according to the invention.

FIG. 5 schematically illustrates a fourth embodiment of an electrical distribution module 5.

It shows the first and second identical devices 6, 7 including the output terminals 14 to 17 and 20 to 23, the input terminals 18, 19, 24, 25, the charging terminals 32, 33, 34, 35.

As the devices 6 and 7 are identical, only the architecture of the first device 6 is described.

The first device 6 comprises a main power supply line 60 extending between input terminals 18, 19 and the output terminals 14 to 17.

The main power supply line 60 comprises the power bus 41 connected to the output terminals 14 to 17 by means of two fast switching means of the SSPC semi-conductors 61, 62 type each controlling a different pair of output terminals 14 to 17, and connected to the input terminals 18, 19 by means of the main switching means 39.

The charging terminals 32, 33 are connected to the main power supply line 60 between the input terminals 18, 19 and the main switching means 39 by means of the charge switching means 44.

The fast switching means 61 and 62 comprise the pre-charging device for preventing an overcurrent during the connection of the rotating electric machines 3, 4 to the bus 41.

The first device 6 further comprises a secondary power supply line 63 comprising second output terminals 64 to 67 connected to the bus 41 by first and second secondary switching means 68, 69, the first secondary switching means 68 connecting the second output terminals 64, 65 to the bus 41, and the second secondary switching means 69 connecting the second output terminals 66, 67 to the bus 41.

The switching means 68 and 69 comprise a device for pre-charging the capacitors of the rotating electric machines 3, 4 making it possible to slowly charge the capacitors of said electric machines in order to prevent an overcurrent during the connection of the motors to the bus 41.

The fast switching means 61 and 62 on the one hand and the secondary switching means 68 and 69 on the other hand are of dissimilar technology and are dissimilar on their control in order to protect against the common modes of the fast switching means and of the secondary switching means.

The first device 6 further comprises control means 70 performed for example from a controller.

The input terminals of the secondary power supply line of the second device 7 are noted 71, 72, 73, 74.

The charging terminals 32, 33 of the first device 6 are connected to the charging terminals 34, 35 of the second device 7.

A first pair of second output terminals 64, 65 connected to the first secondary switching means 68 is connected to a second pair of output terminals 22, 23 of the second device 7.

The second pair of output terminals 66, 67 connected to the second secondary switching means 69 is connected to the first pair of output terminals 21, 22 of the second device 7.

A first pair of output terminals 71, 72 of the secondary power supply line of the second device 7 is connected to a first pair of output terminals 14, 15.

The second pair of output terminals 73, 74 of the secondary power supply line of the second device 7 is connected to the second pair of output terminals 16, 17.

The main switching means 39, the fast switching means 61, 62 of the devices 6 and 7 are closed whereas the first and second secondary switching means 68, 69 of the devices 6 and 7 are open in normal operation.

The charge switching means 44 of the first and second devices 6, 7 are initially open.

During the failure of the source 12 or of the propulsion assembly of the first device 6, the control means 70 open the main switching means 39, the fast switching means 61, 62, and the secondary switching means 68, 69.

As the output terminals 14 to 17 of the first device 6 are connected to the input terminals 71, 72, 73, 74 of the secondary power supply line of the second device 7, the first propulsion assembly is supplied by the second device 7.

Furthermore, if the source 12 is not faulty, the means 70 close the charge switching means 44 making it possible to place the sources 12, 13 in parallel.

During the detection of a failure of a source or of the main power supply line, the first and second devices 6, 7 are reconfigured to supply the propulsion assembly with power from a functional source.

During the charging of the reversible source 12 by the charger 100, the control means 70 close the charge switching means.

During the detection of a failure during the charging of the source 12, the control means 70 open the charge switching means.

The architecture of the devices 6, 7 makes it possible to ensure a power supply redundancy of the propulsion assemblies from identical sources or from sources of different natures, the first device 6 being for example supplied with power by a fuel cell and the second device 7 being for example supplied with power by a DC generator.

The invention claimed is:

1. A DC electrical power distribution device for an aircraft propulsion duct, the power distribution device comprising:
   a main power supply line configured to supply at least one propulsion assembly of the propulsion duct with power from a high-voltage DC electrical power supply source and including main switching means for connecting the source to the propulsion assembly;
   a secondary power supply line configured to be connected to another distribution device and configured to supply the propulsion assembly with power from the other device when the main switching means are open, the main power supply line extending between input terminals configured to be connected to the source and output terminals configured to be connected to the propulsion assembly, the main power supply line comprising a power bus connected to the output terminals and connected to the input terminals by means of the main switching means and fast switching means, and the secondary power supply line being connected to the bus by means of secondary switching means and including input terminals configured to be connected to input terminals of the secondary power supply line of the other device;
   first control means configured to open the main switching means and the fast switching means;
   second control means configured to close the secondary switching means during the detection of a failure of the propulsion assembly, of the main power supply line, or of the source; and
   charging terminals connected between the input terminals and the main switching means or between the main switching means and the fast switching means by charge switching means, the charging terminals configured to charge the reversible power supply source from a charger,
   wherein the first control means are further configured to close the charge switching means in order to charge the reversible source.

2. A propulsion system comprising at least two identical devices according to claim 1, wherein the input terminals of the secondary power supply line of a first device are connected to the input terminals of the secondary power supply line of the second device.

3. An aircraft comprising a propulsion system according to claim 2.

* * * * *